Patented June 22, 1943

2,322,327

UNITED STATES PATENT OFFICE 2,322,327

PRODUCTION OF FERRO-ALLOYS SUBSTANTIALLY FREE OF GANGUE MATERIALS

Leo Henry Timmins, Montreal, Quebec, Canada, assignor to Chromium Mining and Smelting Corpn., Limited, Sault Ste. Marie, Ontario, Canada, a Canadian corporation No Drawing. Application January 9, 1942, Serial No. 426,177

15 Claims. (Cl. 75—28)

This invention relates to metallurgy and has for an object the provision of certain improvements in methods or processes for producing ferro-alloy products. More particularly, the invention contemplates the provision of certain improvements in methods or processes for obtaining metallic ferro-alloy products free or substantially free of gangue materials associated with metallic minerals in ore or concentrates from which the ferro-alloys are derived and free or substantially free of slag material associated with the ferro-alloys in smelting operations in which the ferro-alloys are produced by reduction of alloy metal minerals in ores and concentrates. A particular object of the invention is to provide an improved method or process for recovering high-carbon ferrochromium free or substantially free of gangue materials and slag. A further object of the invention is to provide an improved method or process for recovering alloy metals such, for example, as chromium from crude alloy metal mineral-bearing materials such as ores and concentrates.

According to some heretofore customary practices, ferro-alloys are produced by smelting charges comprising materials such as ores and concentrates containing compounds of iron and alloying elements such, for example, as chromium, manganese, vanadium, tungsten, titanium and molybdenum together with reducing material and slag-forming material to produce molten baths of the ferro-alloys and molten slags containing the gangue materials of the ores and concentrates and the added slag-forming materials.

Smelting of the charge may be carried out in an electric furnace such, for example, as an electric furnace of the submerged arc type in which reduction is carried out continuously and from which the molten ferro-alloy and the molten slag may be tapped continuously or intermittently. According to some heretofore customary practices, the bulky or massive molten ferro-alloy metal product and the molten slag are tapped from the smelting furnace into one or more chills in the form of shallow metal pans in which the ferro-alloy is permitted to solidify. The molten ferro-alloy and the molten slag may be tapped directly into the chills or they may be tapped from the furnace into a ladle from which they may be poured into one or more chills. When the smelting furnace is tapped frequently and directly into a chill, the quantity of molten metal tapped usually is insufficient to fill the chill employed, and there is formed on the surface of the bath or body of heavier molten ferro-alloy formed in the chill, a layer of slag which protects the ferro-alloy against oxidation during cooling and solidification. Excess molten slag is permitted to overflow the chill during the tapping operation. The excess slag is discarded as a waste product.

The slag, cooled and solidified in contact with the ferro-alloy, adheres tenaciously to the solidified ferro-alloy. After cooling and solidification of the ferro-alloy and the slag in contact therewith, the composite mass is broken into small pieces, as by means of hammers, and the pieces comprising metal and slag are chipped, sand blasted or otherwise treated mechanically to separate the metal and slag and produce clean pieces of ferro-alloy metal. Separation of the ferro-alloy from adhering slag to produce a clean ferro-alloy product is an expensive operation which adds materially to the cost of producing ferro-alloys for industrial uses.

The slag separated from the solidified ferro-alloy metal may have pieces or particles of ferro-alloy metal adhering thereto, and such slag may be returned to the smelting furnace for recovery of the adhering metal.

Because of the nature of the ferro-alloy furnace smelting operation in which there always exists in the furnace a burden of charge material containing unreduced mineral or ore overlying a bath of molten ferro-alloy and slag, substantial quantities of unreduced mineral or ore containing alloy metal compound may float out of the furnace on the surface of the slag during tapping operations. Occasionally, the charge within the furnace bridges over so that little or no charge materials drop into the molten bath, and the slag tapped from the furnace is substantially free of unreduced mineral or ore, but, generally, the pressure of the charge is sufficiently great that a portion of the charge falls into the molten bath as tapping proceeds, and slag having unreduced mineral or ore floating thereon is withdrawn from the furnace. If the furnace is tapped infrequently, the tendency for charge materials to fall into the molten bath is not as great as when the furnace is tapped frequently, because of the relatively short and light column of charge materials existing in the furnace above the bath at the time of tapping. Also, when tapping is carried out infrequently, the total amount of unreduced mineral or ore which flows out with slag is relatively small as compared with the total amount of mineral or ore charged into the furnace. When the furnace is tapped frequently, a relatively long and heavy column of charge materials exists in the furnace above the bath at times of tapping, and the pressure of the charge usually is so great that portions of the charge fall into the molten bath as tapping proceeds, and slag having unreduced mineral or ore floating thereon is withdrawn from the furnace. When tapping is carried out frequently, the total amount of unreduced mineral or ore which flows out with the slag may constitute a substantial proportion of the total amount of mineral or ore charged into the furnace. In the production of high-carbon ferrochromium in a submerged arc type of electric furnace, unreduced chromite in amount equal to as much as ten percent of the chromite charged to the furnace may flow out with the slag when the furnace is tapped frequently. Chromite which passes out of the slag ultimately dissolves wholly or in part in the molten slag.

When excess slag is wasted in accordance with heretofore customary practices, the unreduced mineral or ore is lost, and the over-all recovery of alloy metal from the mineral or ore is relatively low.

The present invention provides a method or process for improving the efficiencies of processes designed for the production of ferro-alloys by providing for the recovery of unreduced mineral or ore from furnace slags and by eliminating the necessity for separating adhering slag from solid ferro-alloy by the expensive mechanical methods employed heretofore.

In accordance with the present invention, the bulky or massive molten ferro-alloy and slag product tapped from the ferro-alloy furnace is so treated as to form a relatively finely divided product comprising solid particles of metal and slag. In a preferred method of the invention, the molten metal and slag product of the ferro-alloy furnace is chilled rapidly to a temperature below the freezing temperatures of the metal and slag under conditions such as to effect granulation of the metal and slag.

Rapid chilling and granulating may be accomplished in any suitable manner, as, for example, by directing a jet of relatively cold gas (such as steam or air) under pressure or liquid (such as water) against a stream of the molten ferro-alloy and molten slag or by pouring the molten ferro-alloy and molten slag into a large volume of water. Rapid chilling of a stream of molten ferro-alloy and molten slag results in the production of a relatively finely divided or granulated solid product consisting of pieces or particles of solid metal and solid slag. Rapid chilling or freezing of the slag prevents solution of the unreduced ore or mineral in the slag. The metal particles are clean or substantially free of adhering slag, and the metal and slag particles may be separated readily by gravity concentration methods with the production of a clean metal product. The unreduced ore or mineral is associated with the slag and may be separated therefrom by gravity concentration or water classification methods.

For effective chilling and granulation of the molten ferro-alloy and molten slag, I may direct one or more jets of cold water against a stream of the ferro-alloy and slag as it pours from the furnace. Preferably, I pour the molten ferro-alloy and slag in such manner that the metal and slag pass downwardly through two or more vertically spaced streams of water flowing transversely of the direction of flow or fall of the metal and slag. The streams of water preferably are formed by flowing the water under about sixty pounds per square inch pressure, more or less, through nozzles having substantially rectangular or oval outlet orifices of such dimensions as to form flat wide streams, that is, streams having greater horizontal than vertical dimensions. The widths and depths of the streams of water will be determined in each case by the size of the stream of metal and slag and its rate of flow. Granulation may be effected substantially entirely by chilling, or the pressure or force of the granulating fluid employed may be such that granulation is assisted also by mechanical disruption of the molten metal and slag.

For purposes of illustration, the invention will be described more particularly with respect to its application to the production of high-carbon ferrochromium.

In accordance with the method of the invention, a charge comprising chromite ore or concentrates or both, basic fluxing materials such as lime (CaO or $CaCO_3$) and carbonaceous reducing agent such as coke is charged into and smelted in a submerged arc type of electric furnace. Charging may be carried out continuously or intermittently to maintain in the furnace a charge column of substantially constant depth. As molten ferrochromium and molten slag accumulate in sufficient quantities from time to time in the bottom of the furnace, the furnace is tapped to withdraw the accumulated molten slag and molten ferrochromium.

The stream of molten ferrochromium and molten slag is caused to flow downwardly through two wide, vertically spaced streams of water flowing in a direction transversely of the direction of flow of the stream of metal and slag. Contact of the water with the molten metal and slag causes chilling, solidification and granulation of the slag and metal with the production of a mass of mixed metal and slag particles. Using water under pressure of about sixty pounds per square inch in amount sufficient to produce substantially instantaneous solidification and granulation, particles having maximum sizes of about one-half inch in the greatest dimension are produced. The particles of ferrochromium are hollow globular or shell-like in form, and both the ferrochromium particles and the slag particles are friable and may be crushed or ground readily.

The mass of mixed metal and slag particles may be subjected to a gravity concentration treatment, as, for example, on jigs or tables to produce a clean metal product substantially free of slag and a slag product substantially free of metal. The slag product may be ground to a degree of fineness sufficient to form separate slag and unreduced chromite particles, and the resulting product may be subjected to a gravity concentration treatment as, for example, by tabling to separate and recover a chromite concentrate. Chromite concentrate thus produced may be incorporated in furnace charge material and returned to the furnace.

When a relatively finely divided metal product is sought as the end product, I prefer to grind the mass of mixed metal and slag particles and subject the resulting ground product to a concentration treatment to product separate metal, chromite and slag products. The metal product is free of slag and chromite and forms an excellent source of ferrochromium for industrial uses. The slag product is free or substantially free of chromite and metal, and it may be wasted. The chromite product may be incorporated as part of a furnace charge and returned to the furnace.

I claim:

1. In the production of a ferro-alloy product, for metallurgical uses, the improvement which comprises finely dividing a massive ferro-alloy furnace product comprising metal and slag and forming a product comprising a mixture of solid particles of metal and slag, and separating the metal and slag particles.

2. In the production of a ferro-alloy product for metallurgical uses, the improvement which comprises granulating a massive ferro-alloy furnace product comprising metal and slag and forming a product comprising a mixture of solid particles of metal and slag, and separating the metal and slag particles.

3. In the production of a ferro-alloy product for metallurgical uses, the improvement which comprises subjecting a molten ferro-alloy furnace product comprising metal and slag to the action of a fluid medium capable of effecting granulation of the molten product with the production of finely divided solid particles, thereby forming a solid product comprising a mixture of solid particles of metal and slag, and separating the metal and slag particles.

4. In the production of a ferro-alloy product for metallurgical uses, the improvement which comprises subjecting a molten ferro-alloy furnace product comprising metal and slag to the action of a liquid medium capable of effecting granulation of the molten product with the production of finely divided solid particles, thereby forming a solid product comprising a mixture of solid particles of metal and slag, and separating the metal and slag particles.

5. In the production of a ferro-alloy product for metallurgical uses, the improvement which comprises subjecting a molten ferro-alloy furnace product comprising metal and slag to the action of a gaseous medium capable of effecting granulation of the molten product with the production of finely divided solid particles, thereby forming a product comprising a mixture of solid particles of metal and slag, and separating the metal and slag particles.

6. In the production of a ferro-alloy product for metallurgical uses, the improvement which comprises subjecting a molten ferro-alloy furnace product comprising metal and slag to the action of liquid water to effect granulation of the molten product with the production of a mixture of metal particles and slag particles, and separating the metal and slag particles.

7. In the production of a ferro-alloy product for metallurgical uses, the improvement which comprises subjecting a molten ferro-alloy furnace product comprising metal and slag to the action of a current of air under pressure to effect granulation of the molten product with the production of a mixture of metal particles and slag particles, and separating the metal and slag particles.

8. In the production of a ferro-alloy product for metallurgical uses, the improvement which comprises subjecting a molten ferro-alloy furnace product comprising metal and slag to the action of a current of water vapor under pressure to effect granulation of the molten product with the production of a mixture of metal particles and slag particles, and separating the metal and slag particles.

9. In the production of a ferro-alloy product for metallurgical uses, the improvement which comprises granulating a massive product of a ferro-alloy furnace comprising metal and slag and forming a finely divided product comprising particles of metal and particles of slag, and subjecting the resulting finely divided product to a concentration treatment to separate the metal and slag particles and to recover a substantially slag-free metal product.

10. In the production of a ferro-alloy product for metallurgical uses, the improvement which comprises subjecting a molten ferro-alloy furnace product comprising metal and slag to the action of a fluid medium capable of effecting granulation of the molten product and forming a finely divided product comprising particles of metal and particles of slag, and subjecting the resulting finely divided product to a concentration treatment to separate the metal and slag particles and to recover a substantially slag-free metal product.

11. In the production of a ferro-alloy product for metallurgical uses, the improvement which comprises granulating a massive product of a ferro-alloy furnace comprising metal, slag and unreduced ore or mineral and forming a finely divided product comprising particles of metal, particles of slag and particles of unreduced ore or mineral, and subjecting the resulting finely divided product to a concentration treatment to separate the metal particles and ore or mineral particles from the slag and to recover a metal concentrate and an ore or mineral concentrate.

12. In the production of a ferro-alloy product for metallurgical uses, the improvement which comprises subjecting a molten ferro-alloy furnace product comprising metal, slag and unreduced ore or mineral to the action of a fluid medium capable of effecting granulation of the molten product and forming a finely divided product comprising particles of metal, particles of slag and particles of unreduced ore or mineral, and subjecting the resulting finely divided product to a concentration treatment to separate the metal particles and ore or mineral particles from the slag and to recover a metal concentrate and an ore or mineral concentrate.

13. In the production of high-carbon ferrochromium, the improvement which comprises subjecting a molten ferrochromium furnace product comprising metal and slag to a granulation treatment with water and forming a finely divided product comprising particles of metal and particles of slag, and subjecting the finely divided product to a concentration treatment to obtain separate metal and slag products.

14. In the production of high-carbon ferrochromium, the improvement which comprises subjecting a molten ferrochromium furnace product comprising metal and slag to a granulation treatment with water and forming a finely divided product comprising particles of metal and particles of slag, subjecting the finely divided product to a concentration treatment to obtain separate metal and slag products, grinding the slag product, and subjecting the product of the grinding treatment to a concentration treatment to separate and recover unreduced ore or mineral contained in the slag.

15. In the production of high-carbon ferrochromium, the improvement which comprises subjecting a molten ferrochromium furnace product comprising metal and slag to a granulation treatment with water and forming a finely divided product comprising particles of metal and particles of slag, grinding the finely divided product, and subjecting the product of the grinding treatment to a concentration treatment to obtain separate concentrates of metal and unreduced ore or mineral.

LEO HENRY TIMMINS.